US009215645B2

(12) United States Patent
Susitaival

(10) Patent No.: US 9,215,645 B2
(45) Date of Patent: Dec. 15, 2015

(54) CONTROLLING NETWORK ACCESSES BY RADIO TERMINALS ASSOCIATED WITH ACCESS CLASSES

(75) Inventor: Riikka Susitaival, Helsinki (FI)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 781 days.

(21) Appl. No.: 13/364,506

(22) Filed: Feb. 2, 2012

(65) Prior Publication Data

US 2012/0281531 A1 Nov. 8, 2012

Related U.S. Application Data

(60) Provisional application No. 61/481,541, filed on May 2, 2011.

(51) Int. Cl.
*H04W 48/06* (2009.01)
*H04W 74/08* (2009.01)
*H04W 48/08* (2009.01)

(52) U.S. Cl.
CPC .......... *H04W 48/06* (2013.01); *H04W 74/0875* (2013.01); *H04W 48/08* (2013.01)

(58) Field of Classification Search
None
See application file for complete search history.

(56) References Cited

U.S. PATENT DOCUMENTS

| | | | |
|---|---|---|---|
| 2010/0057485 A1 | 3/2010 | Luft | |
| 2011/0086642 A1 | 4/2011 | Lee et al. | |
| 2011/0170515 A1* | 7/2011 | Kim | 370/330 |
| 2011/0199901 A1* | 8/2011 | Kavanaugh et al. | 370/230.1 |
| 2011/0201344 A1* | 8/2011 | Ryu et al. | 455/450 |
| 2011/0244907 A1* | 10/2011 | Golaup et al. | 455/509 |
| 2011/0261891 A1* | 10/2011 | Vos et al. | 375/259 |
| 2011/0268046 A1* | 11/2011 | Choi et al. | 370/329 |
| 2011/0269447 A1* | 11/2011 | Bienas et al. | 455/422.1 |
| 2011/0270973 A1* | 11/2011 | Liao | 709/224 |
| 2011/0280199 A1* | 11/2011 | Widell et al. | 370/329 |
| 2012/0033551 A1* | 2/2012 | Liao | 370/230 |
| 2012/0099430 A1* | 4/2012 | Vos et al. | 370/235 |
| 2012/0155406 A1* | 6/2012 | Kim et al. | 370/329 |
| 2012/0231828 A1* | 9/2012 | Wang et al. | 455/509 |
| 2014/0056134 A1* | 2/2014 | Koskinen et al. | 370/230 |

FOREIGN PATENT DOCUMENTS

WO WO 2011/100596 8/2011

OTHER PUBLICATIONS

International Search Report and Written Opinion, Jul. 4, 2012, in International Application No. PCT/IB2012/052176.

(Continued)

*Primary Examiner* — Hassan Phillips
*Assistant Examiner* — Gautam Sharma

(57) ABSTRACT

A terminal's access to a network over a radio interface using access resources is controlled to reduce network load. The terminal is associated with one of a set of access classes and receives information from the network about limited access resources and permitted access classes. Terminals not associated with a permitted access class are prohibited from using the limited access resources. The terminal determines a first set of time periods during which available access resources, permitted for use by the access class of the terminal, may be used by the terminal to access the radio network. The first time period set is different from other sets of time periods permitted for use by other access classes. The terminal communicates using the available access resources during the first set of time periods to reduce network load.

24 Claims, 6 Drawing Sheets

(56) References Cited

OTHER PUBLICATIONS

Vodafone: "Applicability of Access Class Baring for CN Overload Control from Devices Configured for MTC-UMTS", 3GPP Draft; R2-105500, vol. RAN WG2, No. Xi'an; Oct. 4, 2010, XP050452487.
3GPP TS 22.011 v11.1.0 (Sep. 2011), Service Accessibility (Release 11).
3GPP TS 22.011 v10.3.0 (Mar. 2011), Service Accessibility (Release 10).
3GPP TSG RAN WG2 #73bis; Merits of the Slotted Access Methods for MTC, Apr. 11-Apr. 15, 2011, Shanghai, China, R2-112247.
Amokrane, Congestion Control in the Context of Machine Type Communications in 3GPP LTE Networks, ENS Cachan, Brittany Extension, University of Rennes, Jan. 1, 2011, pp. 2-15.
Lien et al., Toward Ubiquitous Massive Accesses in 3GPP Machine-to-Machine Communications, IEEE Communications Magazine, Apr. 2011, pp. 66-74.
International Search Report, Jul. 4, 2012, in corresponding International Application No. PCT/IB2012/052176 (WO 2012/150548 A1).
Sierra Wireless; "Broadcasting of MTC Access Barring", 3GPP TSG SA WG2 Meeting #79E (Electronic), TD S2-103111 rev1, Jul. 6, 2010, XP050458309, pp. 8-9.
Sierra Wireless; "23.888 MTC Access Control by RAN Clean Up", 3GPP TSG SA WG2 Meeting #80, TD S2-103759, Aug. 24, 2010, XP050458759.

* cited by examiner

CONTROLLING NETWORK ACCESSES BY RADIO TERMINALS ASSOCIATED WITH ACCESS CLASSES

PRIORITY APPLICATION

The instant application claims priority to U.S. provisional application No. 61/481,541, filed on May 2, 2011, the contents of which are incorporated herein by reference.

TECHNICAL FIELD

The technology relates to radio communications between radio terminals and access networks, and in particular, to controlling network access by radio terminals associated with access classes.

BACKGROUND

Machine-to-Machine (M2M) applications are automated applications which involve machines or devices communicating through a network without human intervention. Non-limiting example applications include: sales by machines, monitoring (metering, malfunction reporting, etc.), transportation (e.g., emergency calls, fleet management, theft tracking), health care, tracking and location of objects, people, animals, etc., smart energy, supply and provisioning, city automation, manufacturing, etc. The communicating devices can be used in different environments like meters, sensors, cars, cell towers, vending machines, etc. These devices may be spread out over a wide area and may communicate via multiple networks often including one or more radio networks such as cellular mobile networks.

Although cellular mobile networks can facilitate M2M communications, they are typically designed for Human-to-Human (H2H), Human-to-Machine (H2M), and Machine-to-Human (M2H) applications, which are different than M2M applications. Nevertheless, it is desirable for Mobile Network Operators (MNO) to be able to support M2M applications involving autonomous devices, which is why the 3rd Generation Partnership Project (3GPP) is working on specifications to standardize the deployment of M2M applications in 3GPP networks like UMTS and LTE. See, e.g., 3GPP TS 22.368. It is expected that M2M communications will involve a huge number of devices that generate a small amount of traffic, especially as compared to the amount of signaling involved in setting up a connection to communicate that small amount of traffic.

A significant problem that must be resolved is the congestion that may occur due to simultaneous signaling or data messages from a large number of machine type communication (MTC) devices that may overload or otherwise adversely affect the performance of the radio interface, radio networks, and/or core networks. That congestion may cause an overload in any of these areas and could undermine service for both MTC and non-MTC devices.

SUMMARY

A radio terminal communicates with an access network over a radio interface using access resources and is associated with one of a set of access classes. The radio terminal's ability to access the access network depends on whether the access class of the radio terminal is permitted to access the access network. Radio circuitry in the terminal receives information from the network about limited access resources related to one or more access classes permitted to access the access network. Radio terminals that are not associated with a permitted access class are prohibited from using the limited access resources. Processing circuitry in the terminal distributes the terminal's use of the limited access resources by determining a first set of one or more time periods during which one or more available access resources, permitted for use by the access class of the radio terminal, may be used by the radio terminal to communicate with the radio network. The first set of time periods is different from other sets of one or more time periods permitted for use by radio terminals in other access classes to communicate with the radio network. In one embodiment, the first set of one or more time periods includes multiple time periods separated by other time periods during which the radio circuitry is configured to not communicate with the access network using the one or more available access resources. The radio circuitry communicates with the access network using the one or more available access resources during the first set of one or more time periods, thereby reducing a load on the limited access resources.

In one example application, the limited access resources are random access channel (RACH) resources used to acquire a connection with the radio access network. The limited access resources may include one or both of control channel and data channel resources used by the radio terminal to communicate with the radio access network.

An example of the received information is extended access class barring (EAB) information and access class information for the radio terminal. The EAB information indicates which of the set of access classes is using limited access resources. For example, the EAB information is associated with delay-tolerant or low priority communications traffic. The information can be broadcast by one or more base stations in the access network. Based on the broadcast information and the one access class, the processing circuitry determines particular times when the radio circuitry is allowed to transmit an access attempt using the limited access resources. The broadcast information may also indicate a mapping between allowed network access resources and each of the set of network access classes. If there are X access classes, X being a positive integer greater than 1, then the mapping indicates that every Xth access resource corresponds to the discrete time periods spread out over time. Alternatively, a periodicity of the spreading out over time is determined by multiplying X access classes by a resource periodicity of the limited access resources.

In another example embodiment, the processing circuitry further determines an access probability for the radio terminal which is used by the radio terminal to further limit access to the network.

The radio terminal can be a machine type communications (MTC) device and/or a user equipment (UE).

DETAILED DESCRIPTION

The following description sets forth specific details, such as particular embodiments for purposes of explanation and not limitation. But it will be appreciated by one skilled in the art that other embodiments may be employed apart from these specific details. In some instances, detailed descriptions of well known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers. Nodes that communicate using the air interface also have suitable radio communications circuitry. Moreover, the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

Figure 1:
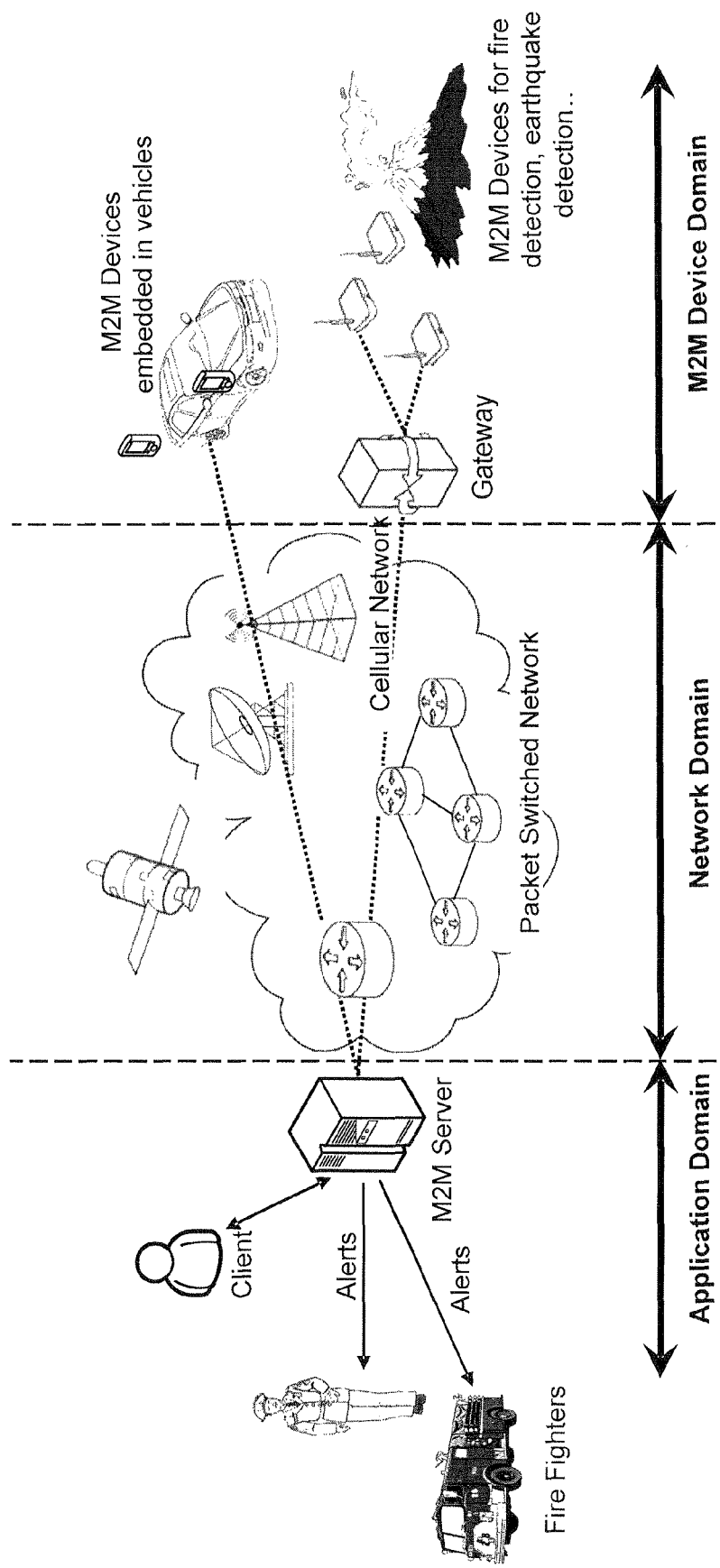
FIG. 1 illustrates a non-limiting example MTM communications system.

A common M2M application uses a device (e.g., a sensor, meter, etc.) to capture an event (e.g., temperature, inventory level, etc.) and sends data through a network (wireless, wired, hybrid, UMTS, LTE, etc.) to an application (a software program) being executed on a computer, e.g., a server. The server processes the received information and may as a result initiate some action as well as possibly send information and/or instructions back to the devices. A generic and simple architecture of a M2M application is illustrated in FIG. 1, which shows an M2M Device Domain containing non-limiting example M2M devices, a Network Domain which relays the messages to one or more M2M servers located in the Application Domain, giving data to associated server M2M applications. The network domain could include an UMTS or LTE network for example. The technology described herein may apply to any network(s), but for purposes of illustration only, the following description employs a non-limiting UMTS/LTE example application.

Figure 2:
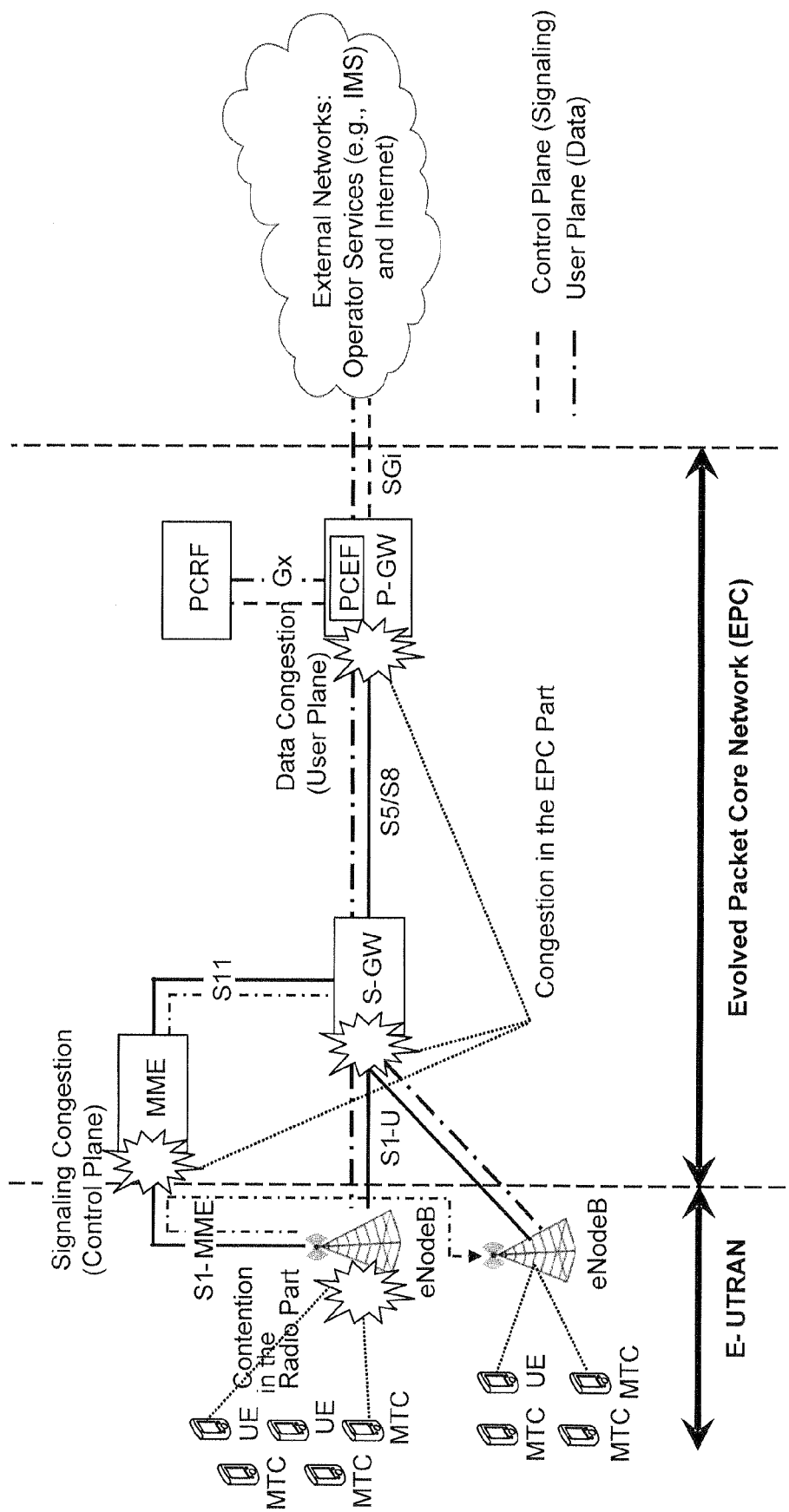
FIG. 2 illustrates non-limiting examples of LTE-based communications showing locations where MTM communication congestion can cause overload or congestion spots.

As explained in the background, MTM-driven congestion and resulting network overload are problems in MTM communications including those supported by UMTS/LTE type networks. FIG. 2 shows examples of MTM-driven congestion points. As shown in FIG. 2, MTC devices (MTCs) and traditional human operated user equipments (UEs) contribute to congestion. The LTE network includes two parts: the E-UTRAN (Evolved UMTS Terrestrial Radio Access Network) and an EPC (Evolved Packet Core Network). The evolution of the non-radio part is sometimes referred to as System Architecture Evolution (SAE), which includes the EPC. Both parts are sometimes referred to as the Evolved Packet System (EPS). The E-UTRAN part includes UEs and MTC devices and base stations called eNodeBs. The EPC part is the Core Network part in the SAE responsible for the overall control of UEs, establishment of bearers or connections between the UEs and the PDN Gateways (e.g., a packet flow or tunnel). The PDN Gateway (P-GW) ensures connection with the IP Network of the operator and allocates IP addresses for UEs, defines QoS enforcement and flow-based charging according to PCRF rules. Furthermore, it is an anchor point for inter-networking with non-3GPP networks. The Serving Gateway (S-GW) is an anchor for data bearers if a UE moves from eNodeB to another (handover). The Mobility Management Entity (MME) processes signaling between UEs and the Core Network. The Policy Control and Charging Rules Function (PCRF) controls decision making and management of the flow based charging functionalities in the Policy Control Enforcement Function (PCEF). The latter resides in the P-GW.

Overload protection or prevention for core network and radio access network are desirable. Typically, MTC device traffic is lower priority than human user traffic. In addition, MTC device traffic is usually delay insensitive or less delay sensitive than traditional human traffic. So one overload protection or prevention approach might be to use a delay tolerant access and extended wait timer to control core network and radio access network overload. However, such a timer approach can be used only after the UE has succeeded in a random access (RA) procedure and a connection with the radio access network is established. But before then, a huge number of MTC devices may cause significant congestion on the random access channel (RACH) with those MTC devices requesting access. There are also other channels that are used in the random access process and may be considered with regard to congestion such as the physical dedicated control channel (PDCCH) in LTE.

Access Class Barring (ACB) is a known mechanism that prevents a UE from establishing a radio resource control (RRC) connection with the radio access network (RAN). ACB helps to avoid a synchronized "rush" of a larger number of UE random accesses at the same time to the RAN and the core network. Access Class Barring is based on the Access Class (AC) embedded in the USIM/SIM of a UE. Currently, LTE provides for 16 ACs, and all UEs are members of one of the AC between AC 0 and AC 9. The ACs 0-9 are randomly distributed, meaning that all UEs are members of one out of ten randomly-allocated UE groups due to their randomly-assigned AC class. A UE may also be allocated one of the AC11-AC15 classes, which are not randomly assigned. Thus, MTC devices may be assigned an AC between 0 and 9, and if a higher priority is needed, other classes may be used. In particular embodiments, AC 10 is used for an emergency call, while AC 11 to AC 15 are special high priority classes. For example, AC 13 may be reserved for public utilities such as water and gas suppliers.

An Extended Access Barring (EAB) mechanism is described for LTE Rel-10 in TS 22.011. The EAB mechanism can be used to control UE-originating access attempts by UEs configured with EAB, e.g., if there is congestion in the radio access network or the core network. When a determination is made that a network load or network congestion needs to be reduced, limited, or regulated one or more eNodeBs broadcast EAB information to the UEs in a specific area. In an example embodiment, delay-tolerant MTC devices are configured with this EAB mechanism along with UEs, and EAB information is broadcast by the network which defines whether the extended access barring is applicable to UEs and MTC devices and also includes extended barring information for Access Classes 0-9. Thus, a UE and/or MTC device configured for EAB takes into account its allocated Access Class (AC 0-9) and the EAB information when determining whether the UE's and/or MTC device's access to the network is barred or permitted.

But in this situation, all of the UEs and MTC devices will still have the same access priority level, which means that currently certain devices or services can not be associated with lower (or higher) priority access rights. In addition, not all MTC devices with high priority access can be classified as a public utility, which means that AC 13 may not be a suitable access class. It would be better if the AC and EAB information could be used to selectively bar or delay access for devices which are time tolerant or have a low priority level.

One way to selectively control low priority device access might be to broadcast a bitmap that defines whether a particular UE or MTC device is barred or not. But, in order to allow each UE category to access the network at different times, the bitmap requires frequent changes in the broadcast system information. This is costly in terms of signaling, and likely also increases the access delay for the MTC devices unnecessarily.

Accordingly, in a preferred example embodiment, a delay-tolerant radio terminal, e.g., an MTC device, defines its available access resource for accessing the radio network, e.g., its RACH resource, so as to distribute its associated access network load, e.g., its RACH load, based on an access class assigned to the radio terminal, e.g., one of ACs 0-9, and EAB information provided by the network node such as an eNB. More specifically, by spreading network accesses over time, the access network overload is reduced. Moreover, because access classes and thus network accesses are spread over many devices in a distributed manner, congestion due to access attempts is alleviated. Since this technology can be applied to any channel, and not just a RACH, it can be used to reduce, for example, RACH overload, PDCCH overload, PDSCH overload, PUSCH overload, and PUCCH overload.

In the preferred but still example embodiment, the network node (e.g., an eNodeB) broadcasts extended access barring information for receipt by the radio terminals that includes (1) an indication that all of the access classes (e.g., AC0-AC9), are using limited access resources (e.g., limited RACH resources), or (2) an indication which of the access classes is using limited access resources. The broadcast information may, for example, be included in system information such as in SIB2 in E-UTRAN.

When a radio terminal (e.g., an MTC device) receives the EAB broadcasted information about the limited access resources, the radio terminal defines, also taking into account its access class, when it is allowed to make an access attempt. In other words, the radio terminal self-restricts itself so that it uses the access channel only in a certain time so that multiple access attempts originating from multiple radio terminals are spread out over time (e.g., multiple space-apart time periods) rather than all or a large number of radio terminals devices attempting access at once. The resource limitation may be applied to an initial RACH attempt and all access attempts on all channels, e.g., RACH, PDCCH, PDSCH, PUSCH, etc.

Figure 3A:
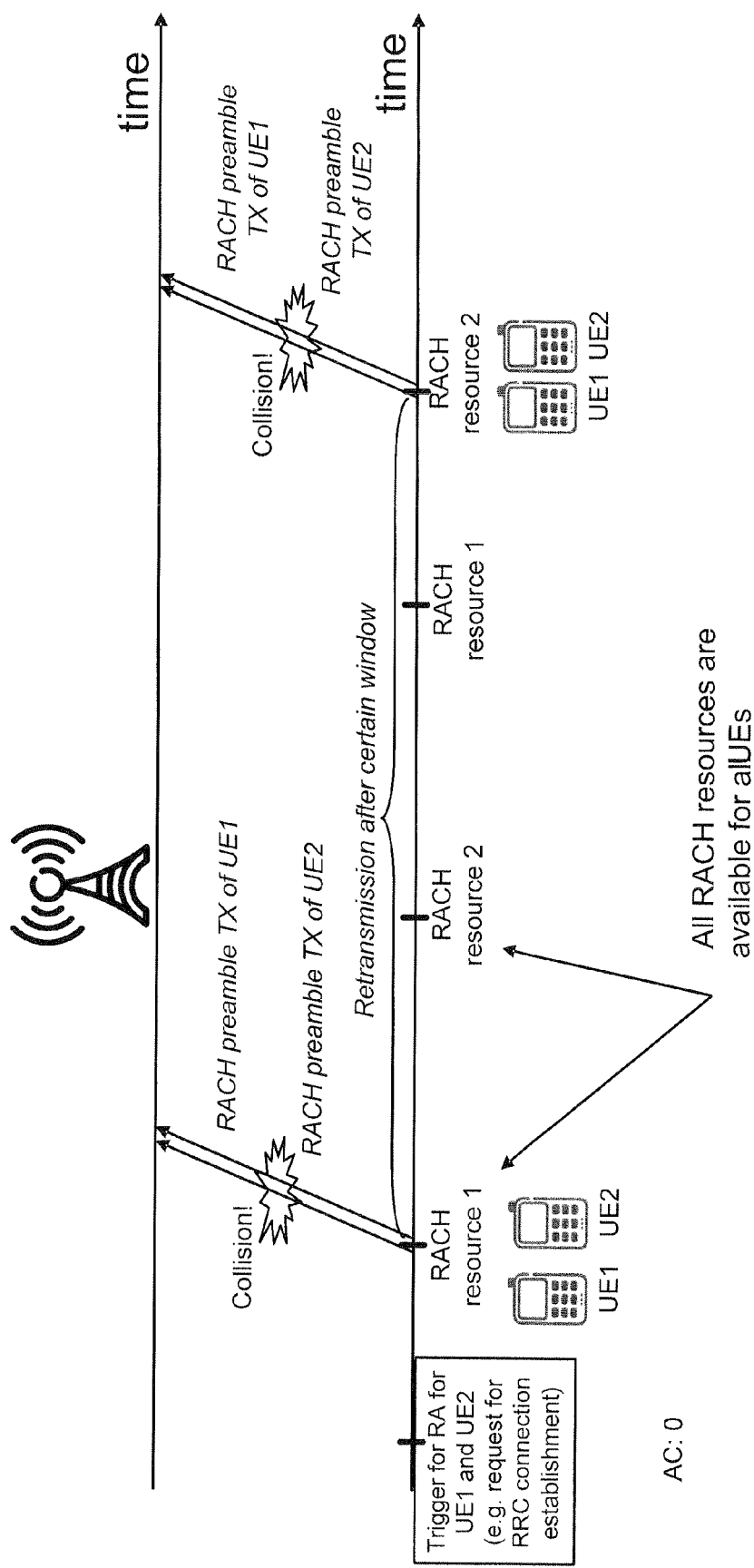
FIGS. 3A and 3B provide example scenarios that illustrate random access collision and random access without collision.
Figure 3B:
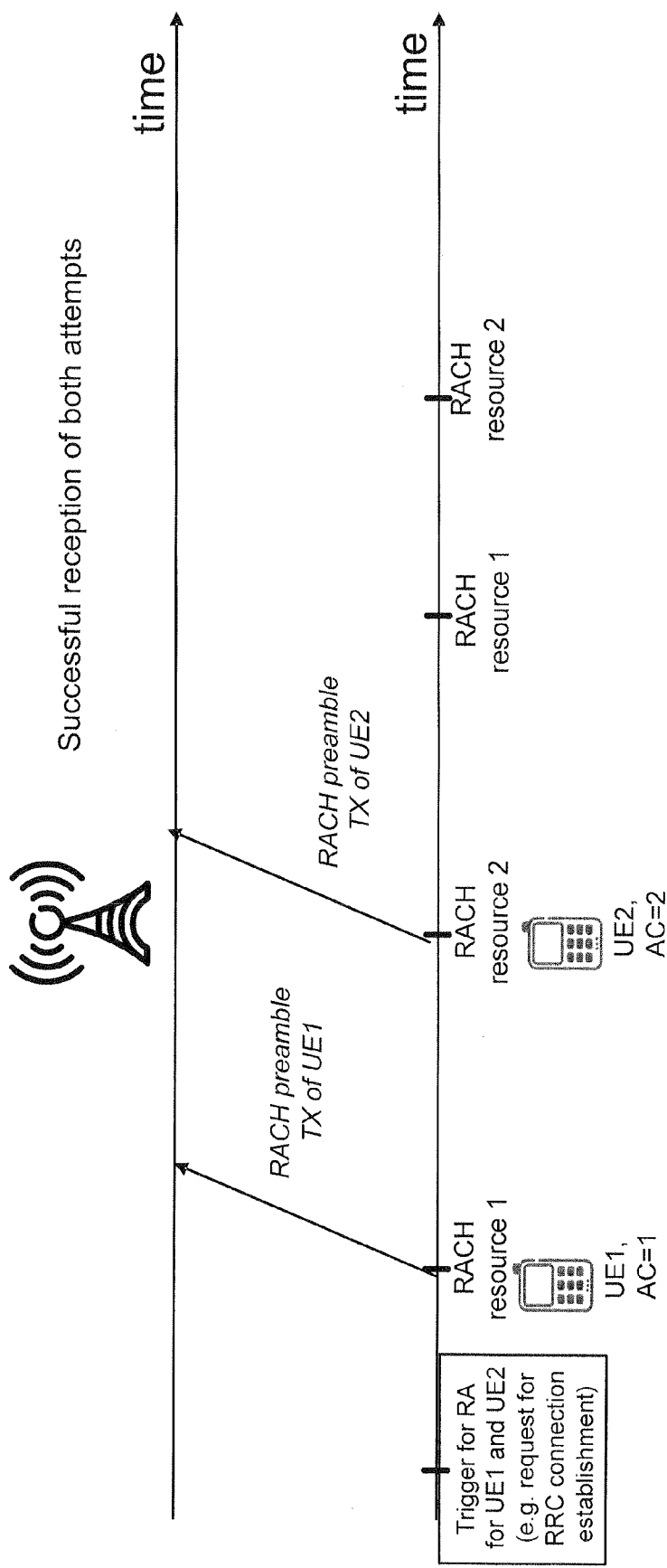

FIGS. 3A and 3B provide example scenarios that illustrate random access collision and random access without collision. In FIG. 3A, two UEs 1 and 2 use the same RACH resource 1 at the same time to transmit their respective random access preambles to a base station (both UEs are requesting an RRC connection). As a result, the two transmissions collide. Both UEs retry transmission after a certain waiting window that expires on a RACH resource 2, but since they wait for the same time period, they both transmit their respective RACH preambles on the RACH resource 2 at the same time which again results in collision. But using the technology just described, these collisions are avoided as shown in FIG. 3B. Even though both UEs want to request an RRC connection at the same time, because UE 1 belongs to AC 1 and UE 2 belongs to AC 2, and AC 1 and AC 2 using different RACH resources separated in time, i.e., RACH resource 1 and 2, respectively, there is no collision, and the base station successfully receives both RACH preamble transmissions.

Accordingly, the radio terminal determines that it will use access resources allocated to its given access class at given time periods which differ from those access resources allocated to other access classes. A mapping between an access resource and an access class may be static, such as for example in the RRC protocol specification TS 36.331 and TS 25.331. Alternatively, the mapping can be dynamic and indicated in the broadcast information.

In one non-limiting embodiment applied to RACH resources, a UE defines its RACH time based on its access class in terms of radio frame and subframe. In another non-limiting example applied to RACH resources, assuming there are 10 access classes, every 10th RACH resource may be available for one access class for an initial RACH attempt. Both example embodiments spread the initial RACH attempt over multiple spaced-out intervals in the time domain. In another example embodiment, there are two physical RACH resources per radio frame of 10 ms, that is, one resource per 5 ms. A radio terminal with an AC 0 determines and makes an initial RACH attempt in subframe 0 of every 5th radio frame, where as a radio terminal with AC 1 determines and makes an initial RACH attempt in subframe 5 of every 5th radio frame.

The spreading periodicity may for example be determined by multiplying the number of access classes by the RACH resource periodicity. For example, if there are 10 access classes and a RACH resource periodicity of 5 ms, radio terminals in each access class use RACH resources every 50 ms, which increases the delay for these radio terminals before being granted an initial connection with the access network. But this delay is tolerable for most delay-tolerant radio devices like MTC devices.

If after time-spreading of the RACH attempts based on access class, the access rate for a specific subframe is still too high, another example embodiment includes access probabilities to reduce that high access rate. For example, a radio terminal may further limit its initial RACH attempts with a probability p in a subframe y, where y may be determined for example based on the access class of the radio terminal. In the non-limiting example, a UE with a certain access class is initially allowed to use RACH resources of certain subframes, as is described in earlier embodiments. However, in this example embodiment, before using the resources, the UE must further check if the subframe is allowed by determining a random number and checking if the value is below a threshold broadcasted by the network. If the access is not permitted, then the UE tries again in the next allowed RACH resource.

Figure 4:
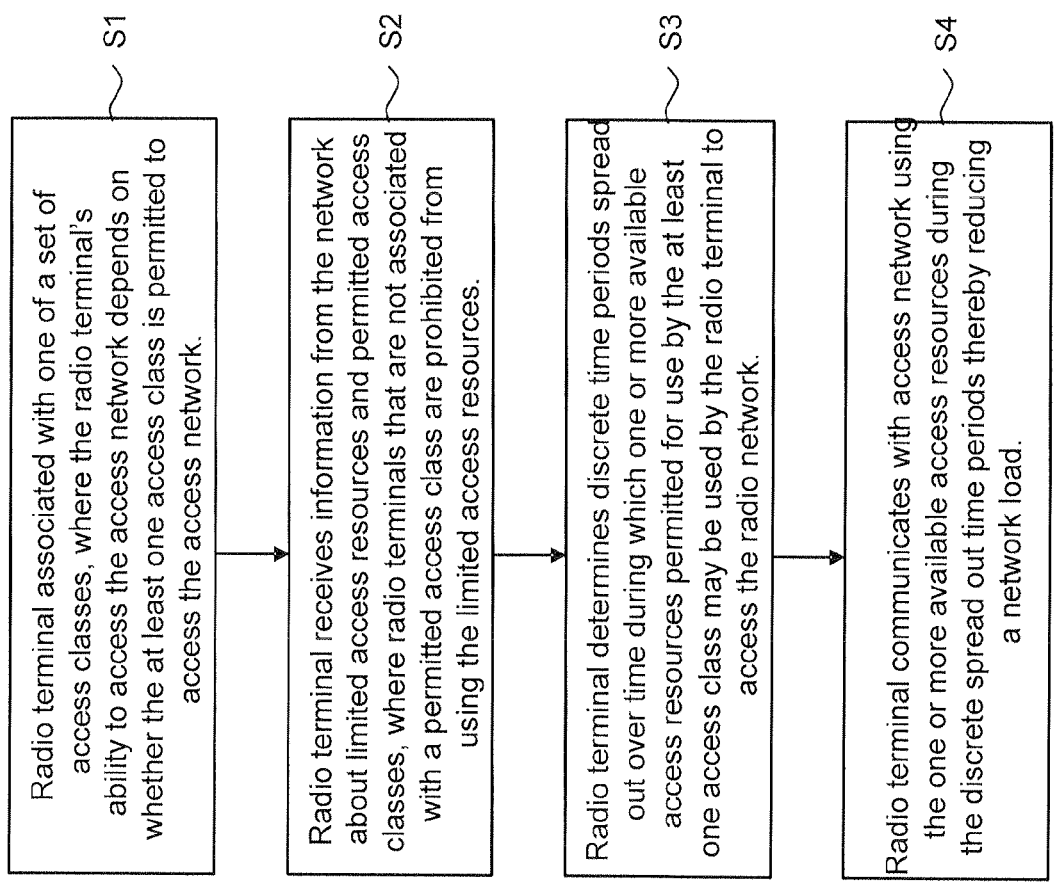
FIG. 4 is a flow chart illustrating non-limiting example steps performed by a radio terminal to reduce overloading.

A non-limiting example method for controlling a radio terminal's access to an access network over a radio interface using access resources is now described in conjunction with the flowchart diagram in FIG. 4. The radio terminal is associated with one of a set of access classes, and the radio terminal's ability to access the access network depends on whether the one access class is permitted to access the access network (step S1). The radio terminal receives information from the network about limited access resources and permitted access classes (step S2). Radio terminals that are not associated with a permitted access class are prohibited from using the limited access resources. The radio terminal determines discrete time periods spread out over time during which one or more available access resources permitted for use by the one access class may be used by the radio terminal to access the radio network (step S3). The radio terminal communicates with the access network using the one or more available access resources during the discrete spread out time periods thereby reducing a network load (step S4). As discussed above, in particular embodiments, the access resource may represent resources on a random access channel (e.g., the RACH in LTE networks), and the radio terminal's communication with the access network may involve the radio terminal performing a random access procedure, such as the example procedure described above with respect to FIG. 3B, to establish a connection with the radio network. After establishing this connection, the radio terminal may then proceed with normal communication with the radio network in accordance with the access technology supported by the relevant radio network.

Figure 5:
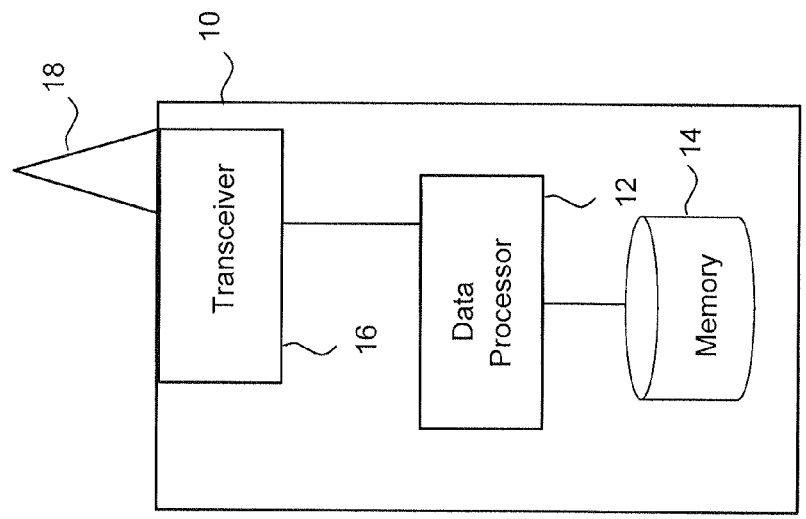
FIG. 5 is a diagram illustrating non-limiting example function block elements for a radio terminal like an MTC device and/or a user equipment.

FIG. 5 illustrates a radio terminal 10 representing an MTC device or a UE which may include any suitable combination of hardware alone or hardware that executes software programs to implement the functionality described above. The example radio terminal includes electronic circuitry including a data processor 12, a memory 14, a radio transceiver 16. The radio transceiver 16 is coupled to one or more antennas 18. In non-limiting example embodiments, some or all of the functionality described above for the radio terminal may be provided by the processor 12 executing instructions stored on a computer-readable medium, such as the memory 14. Alternative non-limiting example embodiments of the radio terminal 10 may include additional components beyond those shown in FIG. 5 that may be responsible for providing certain aspects of the radio terminal's functionality, including any of the functionality described above and/or any functionality necessary to support the example embodiments described above.

Figure 6:
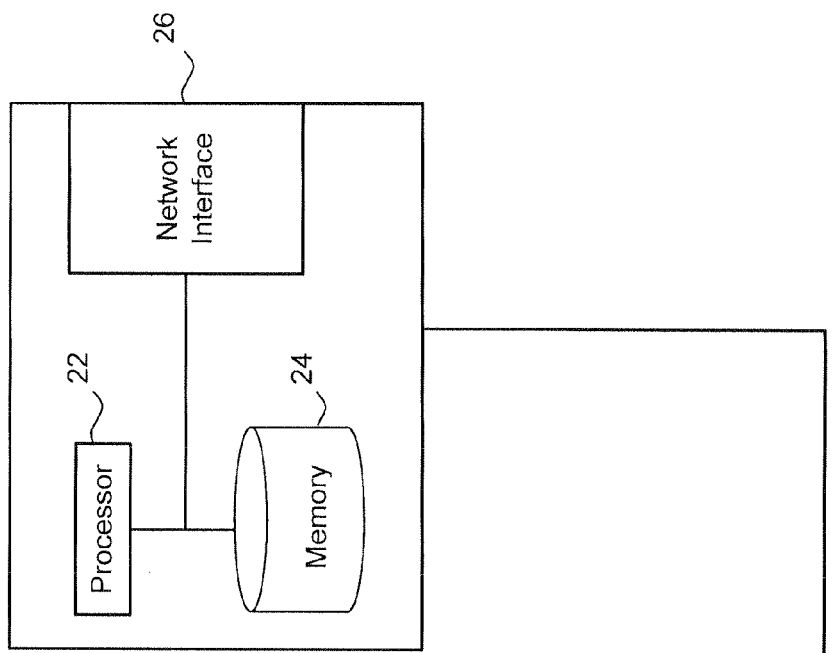
FIG. 6 is a diagram illustrating non-limiting example function block elements for a base station type node.
Figure 6:
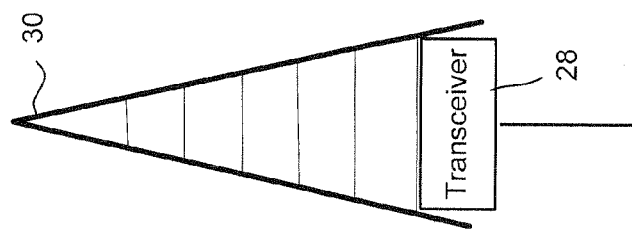

As shown in FIG. 6, the non-limiting example base station 20 includes electronic circuitry such as a data processor 22, a memory 24, a network interface 26, and one or more radio transceivers 28. The one or more radio transceivers 26 are coupled to one or more antennas 30. In non-limiting example embodiments, some or all of the functionality described above as being provided by a base station may be provided by the base station processor 22 executing instructions stored on a computer-readable medium, such as the memory 24. Alternative example embodiments of the base station 20 may include additional components responsible for providing additional functionality, including any of the functionality identified above and/or any functionality necessary to support the embodiments described above.

Additionally, the functionality described above as being provided by the network generically may, in particular embodiments, be provided by the example base station. Alternatively, such functionality may be provided by specialized network nodes within the network that are similar in structure to the example base station but are not configured for wireless communication (e.g., they may lack the illustrated antenna and transceiver). Such network nodes may be configured instead to communicate over wireline connections with other appropriate elements of the access network that can themselves communicate wirelessly with MTC radio nodes served by the communication system. As a result, such network nodes may communicate with MTC radio nodes indirectly through other elements of the access network.

The example embodiments reduce or eliminate access network overload problems associated with simultaneous access by many MTC devices.

Although the description above contains many specifics, they should not be construed as limiting but as merely providing illustrations of some presently preferred embodiments. The technology fully encompasses other embodiments which may become apparent to those skilled in the art. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for a device or method to address each and every problem sought to be solved by the described technology for it to be encompassed hereby.

The invention claimed is:

1. A radio terminal configured to communicate with an access network over a radio interface using access resources, the radio terminal being associated with one of a set of access classes, each access class being associated with an access priority level, where the radio terminal's ability to access the access network depends on whether the access class and associated access priority level of the radio terminal is permitted to access the access network, the radio terminal comprising:

radio circuitry configured to receive information from the access network about limited access resources related to one or more access classes permitted to access the access network, where radio terminals that are not associated with a permitted access class are prohibited from using the limited access resources, and processing circuitry, coupled to the radio circuitry, configured to distribute use of the limited access resources by determining, based on the access class and associated access priority level of the radio terminal, a first set of one or more time periods during which one or more available access resources, permitted for use by the access class and associated access priority level of the radio terminal, may be used by the radio terminal to communicate an initial access attempt to acquire a connection with the access network, the first set of one or more time periods being different from other sets of one or more time periods permitted for use by radio terminals in other access classes to communicate with the access network, wherein the radio circuitry is configured to self-restrict communication with the access network using the one or more available access resources such that the initial access attempt to acquire the connection with the access network is not made before the first set of one or more time periods thereby reducing a load on the limited access resources.

2. The radio terminal in claim 1, wherein the first set of time periods includes multiple time periods separated by other time periods during which the radio circuitry is configured to not communicate with the access network using the one or more available access resources.

3. The radio terminal in claim 1, wherein the limited access resources are random access channel (RACH) resources used to acquire a connection with the access network, and wherein the radio circuitry is further configured to connect to the access network by performing a random access procedure on a RACH resource during one or more of the time periods in the first set.

4. The radio terminal in claim 1, wherein the limited access resources include one or both of control channel and data channel resources used by the radio terminal to communicate with the access network.

5. The radio terminal in claim 1, wherein the received information includes extended access class barring (EAB) information and access class information for the radio terminal, the EAB information indicating which of the set of access classes is using limited access resources.

6. The radio terminal in claim 5, wherein the received information is from one or more broadcasts by one or more base stations in the access network, and based on the received broadcast information and the access class of the radio terminal, the processing circuitry is configured to determine particular times when the radio circuitry is allowed to transmit an access attempt using the limited access resources.

7. The radio terminal in claim 6, wherein the received broadcast information indicates a mapping between time periods and one or more access classes.

8. The radio terminal in claim 7, wherein there are X access classes, X being a positive integer greater than 1, and wherein the mapping indicates that every Xth access resource corresponds to the discrete time periods spread out over time.

9. The radio terminal in claim 5, wherein there are X access classes, X being a positive integer greater than 1, and wherein a periodicity of the spreading out over time is determined by multiplying X access classes by a resource periodicity of the limited access resources.

10. The radio terminal in claim 5, wherein the processing circuitry is configured to determine an access probability for the radio terminal, which is useable by the radio terminal to further limit access to the access network.

11. The radio terminal in claim 5, wherein the EAB information is associated with delay-tolerant or low priority communications traffic.

12. The radio terminal in claim 1, wherein the radio terminal is a machine type communications (MTC) device.

13. The radio terminal in claim 1, wherein the radio terminal is a user equipment (UE).

14. A method for controlling a radio terminal's access to an access network over a radio interface using access resources, the radio terminal being associated with one of a set of access classes, each access class being associated with an access priority level, where the radio terminal's ability to access the access network depends on whether the access class and associated access priority level of the radio terminal is permitted to access the access network, the method comprising:
  the radio terminal receiving information from the access network about limited access resources and permitted access classes, where a radio terminal that is not associated with a permitted access class is prohibited from using the limited access resources;
  the radio terminal determining based on the access class and associated access priority level of the radio terminal a first set of one or more time periods during which one or more available access resources, permitted for use by the access class and associated access priority level of the radio terminal, may be used by the radio terminal to communicate an initial access attempt to acquire a connection with the access network, the first set of one or more time periods being different from other sets of one or more time periods permitted for use by radio terminals with other access classes to communicate with the access network,
  the radio terminal self-restricting communication with the access network using the one or more available access resources such that the initial access attempt to acquire the connection with the access network is not made before the first set of one or more time periods thereby reducing a network load.

15. The method in claim 14, wherein the method is applied to machine to machine (M2M) communications.

16. The method in claim 14, wherein the first set of one or more time periods includes multiple time periods separated by other time periods during which the radio circuitry is configured to not communicate with the access network using the one or more available access resources.

17. The method in claim 14, wherein the limited access resources are random access channel (RACH) resources used to acquire a connection with the access network and wherein the method further comprises connecting to the access network by performing a random access procedure on the RACH resource during one or more of the time periods in the first set.

18. The method in claim 14, wherein the limited access resources include one or both of control channel and data channel resources used by the radio terminal to communicate with the access network.

19. The method in claim 14, wherein the received information includes extended access class barring (EAB) information and access class information for the radio terminal, the EAB information indicating which access classes are using limited access resources.

20. The method in claim 19, wherein:
  receiving the information comprises receiving information broadcast by one or more base stations in the access network, and
  determining the first set of time periods comprises determining the first set of time periods based on the broadcast information and the access class of the radio terminal.

21. The method in claim 20, wherein the broadcast information indicates a mapping between time periods and one or more access classes.

22. The method in claim 21, wherein there are X access classes, X being a positive integer greater than 1, and wherein the mapping indicates that every Xth access resource corresponds to the discrete time periods spread out over time.

23. The method in claim 14, wherein there are X access classes, X being a positive integer greater than 1, and wherein a periodicity of the spreading out over time is determined by multiplying X access classes by a resource periodicity of the limited access resources.

24. The method in claim 14, further comprising:
  determining an access probability for the radio terminal, and
  using the determined access probability to further limit access to the access network.

* * * * *